US012044459B2

(12) United States Patent
Dusar

(10) Patent No.: US 12,044,459 B2
(45) Date of Patent: Jul. 23, 2024

(54) SLIDING DOOR ARRANGEMENT FOR A FREEZER CABINET

(71) Applicant: Heinz Dusar, Anhausen (DE)

(72) Inventor: Heinz Dusar, Anhausen (DE)

( * ) Notice: Subject to any disclaimer, the term of this patent is extended or adjusted under 35 U.S.C. 154(b) by 299 days.

(21) Appl. No.: 17/013,074

(22) Filed: Sep. 4, 2020

(65) Prior Publication Data

US 2022/0003486 A1 Jan. 6, 2022

(30) Foreign Application Priority Data

Jul. 2, 2020 (EP) .................................... 20183820

(51) Int. Cl.
*E05D 15/10* (2006.01)
*F25D 23/02* (2006.01)

(52) U.S. Cl.
CPC ....... *F25D 23/021* (2013.01); *E05D 15/1042* (2013.01); *E05D 2015/1057* (2013.01)

(58) Field of Classification Search
CPC ........... F25D 23/021; E05D 2015/1057; E05D 15/1021
USPC .................................................... 49/209, 213
See application file for complete search history.

(56) References Cited

U.S. PATENT DOCUMENTS 3,074,124 A * 1/1963 Bergstedt
4,565,031 A * 1/1986 Sakamoto ........... E05D 15/1042 49/130
4,704,819 A * 11/1987 Tutikawa ............ E05D 15/1042 49/213
5,461,829 A * 10/1995 Lehto .................. E05D 15/1021 49/225
5,899,303 A * 5/1999 Allen
6,336,248 B1 * 1/2002 Finkelstein ......... E05D 15/1042 16/87.4 R
10,724,282 B2 * 7/2020 Seo ......................... E05D 15/10
2006/0090401 A1 * 5/2006 Berry .................... F25D 23/087 49/409
2010/0120351 A1 * 5/2010 Morris et al.
2019/0024426 A1 * 1/2019 Seo
2019/0264484 A1 * 8/2019 Tuminella ........... E05D 15/0652
2020/0079146 A1 * 3/2020 Wang .................... B60B 19/003

* cited by examiner

*Primary Examiner* — Daniel P Cahn
*Assistant Examiner* — Patrick B. Ponciano
(74) *Attorney, Agent, or Firm* — Calfee, Halter & Griswold LLP

(57) ABSTRACT

The invention relates to a sliding door arrangement for a freezer cabinet, comprising a door frame, at least one sliding door, wherein the sliding door is movable along the frame plane between an open position and a closed position, and a guiding device. The guiding device comprises roller arrangements each with a first roller axis and at least one guiding element guiding the movement of the sliding door. The sliding door arrangement is characterized in that the guiding device is designed in such a manner that the sliding door moves transversely to the frame plane during a movement from the open position to the closed position, for which purpose, the guiding element has a parallel portion and an end portion, and the roller arrangements each have at least one further roller axis.

13 Claims, 3 Drawing Sheets

SLIDING DOOR ARRANGEMENT FOR A FREEZER CABINET

Figure 1:
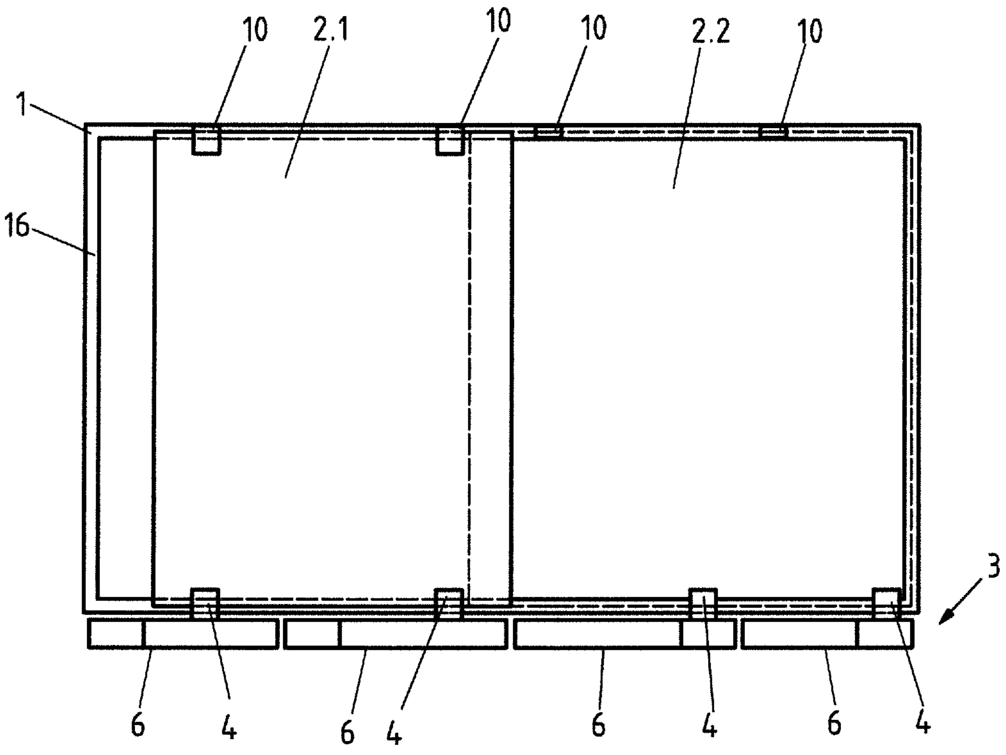

This application claims priority to European Patent Application No. EP 20 183 820.8, filed on Jul. 2, 2020. The entirety of such application is incorporated herein by reference.

The present invention relates to a sliding door arrangement for a freezer cabinet, comprising a door frame, wherein the door frame defines a frame plane which is in particular aligned vertically, at least one sliding door, wherein the sliding door is movable along the frame plane between an open position and a closed position, and a guiding device for guiding the sliding door between the open position and the closed position, wherein the guiding device comprises roller arrangements each having a first roller axis and at least one guiding element guiding the movement of the sliding door.

Such sliding door arrangements are well known for refrigerated cabinets where a temperature in the refrigerated cabinet is to be maintained in the low positive single-digit range. It has been found that the known sliding door arrangements are not suitable for freezer cabinets where temperatures of approximately −20° C. are generated. In fact, it has been shown that the known sliding door arrangements do not seal sufficiently enough, so that ambient air penetrates into the freezer thereby causing undesired formation of ice in the freezer.

It is therefore an object of the present invention to eliminate the disadvantages described with reference to the prior the art, and in particular to specify a sliding door arrangement which ensures a sufficient sealing with respect to the environment for freezer cabinets.

The object is achieved by a sliding door arrangement with the features of the independent claim. Advantageous further developments of the sliding door arrangement are specified in the dependent claims and in the description, wherein individual features of the advantageous further developments can be combined with each other in a technically reasonable way.

The object is achieved in particular by a sliding door arrangement with the features mentioned at the beginning, in which the guiding device is designed in such a manner that the sliding door moves transversely to the frame plane during a movement from the open position to the closed position, wherein the guiding element has a parallel portion arranged parallel to the frame plane and an end portion arranged transversely to the parallel portion, and further wherein the roller arrangements each have a further second roller axis so that during a movement along the guiding element, the roller arrangements can move parallel to the parallel portion and also transversely thereto.

The invention in its basic idea provides that during a movement from the open position to the closed position, the sliding door, towards the end of the closing movement, is moved transversely to the frame plane and thus towards the door frame, whereby a pressure force of the sliding door on the door frame is increased and thus the tightness of a seal arranged between the door frame and the sliding door can also be increased, whereas the sliding of the sliding door along the frame plane can be done without applying much force, as there is little or no friction between the sliding door and the door frame.

In order to allow the sliding door to move transversely to the frame plane, it is now proposed that the one or more guiding element(s) includes/include a parallel portion and an end portion possibly consisting of a plurality of components. The parallel portion or its components is/are arranged in such a manner that a movement of the sliding door is guided parallel to the frame plane. The end portion or its components, on the other hand, is/are designed in such a manner that the sliding door is moved transversely (obliquely) to the frame plane at least shortly before reaching the closed position, thereby moving the sliding door towards the door frame. When opening the sliding door, the end portion ensures that the sliding door is first moved away from the door frame so that subsequently, the sliding door can be easily transferred into an open position.

In addition, each roller arrangement has a second roller axis whereby it is achieved that during the closing movement towards the door frame, a movement/alignment of the roller arrangement absorbing this closing movement takes place. In fact, it has been found that when using a roller with exactly one axis of rotation (also referred to as a fixed roller, for example), it is not possible to achieve sufficient pressing force to ensure sufficient sealing.

In particular, the roller arrangement is arranged on the sliding door while the guiding element is stationarily connected to the door frame in a suitable manner or is formed and/or arranged thereon.

In particular, each sliding door is assigned at least two roller arrangements, wherein each roller arrangement can in turn be assigned its own guiding element. However, it may also be provided that just one guiding element is assigned to the plurality of roller arrangements of a sliding door. The sliding door comprises at least one pane of (insulating) glass, so that a customer can look into the interior of a freezer cabinet. The glass pane is inserted in a sliding door frame which also includes the elements of the guiding device and in particular the roller arrangements.

Preferably, the sliding door arrangement has exactly two sliding doors which are arranged on opposite sides of the door frame and each have a guiding device.

The roller arrangement can be designed, for example, as a so-called omni wheel of which the running surface of the wheel itself consists of rollers. This omni wheel rotates about the first (main) axis when moving parallel to the frame plane while the rollers forming the running surface are stationary. During the closing movement (transverse to the frame plane) towards the door frame, in addition, a rotational movement of at least one of the rollers forming the running surface about a second roller axis (assigned to the respective roller) takes place.

However, preferred is an embodiment in which the first roller axis can rotate about the second roller axis so that the roller arrangements automatically align themselves with both the parallel portion and the end portion when moving along the guiding element. In this embodiment, each roller arrangement has exactly one roller which, when moving between the open position and the closed position, rotates about the horizontally aligned first roller axis, while the roller can align itself according to the direction of movement of the sliding door when rotating/swiveling about the second roller axis which is in particular oriented vertically. Such a roller arrangement is in particular also known as a guide coaster. During the movement of the sliding door parallel to the frame plane, the first roller axis is thus aligned orthogonal to the frame plane while the first roller axis, due to a rotation/swivel about the second roller axis, is accordingly rotated/swiveled about the second roller axis during the movement towards the door frame (transversely to the plane of the frame).

In both the embodiments described above, the further second roller axis is aligned parallel to the frame plane. In particular, the second roller axis is also aligned at a right angle to the first roller axis, wherein the second roller axis can intersect the first roller axis or can be arranged offset (skew) thereto.

In principle, it is conceivable that the guiding device according to the invention is arranged on an upper side of the sliding door so that the sliding door would be suspended by means of the guiding device. However, it is preferred that the guiding device and thus also the guiding elements and the roller arrangements are arranged on a lower side of the sliding door.

It is preferred, in particular if the guiding device is arranged on a lower side of the sliding door, that the roller arrangements rest on at least one guide rail designed as a guiding element. In this context, the parallel portion is formed by a portion of the guide rail aligned parallel to the frame plane frame while the end portion is formed by a portion of the guide rail angled with respect to the parallel portion. In particular if in this context the roller arrangement is designed as a so-called guide coaster, the roller may have a recess with which the roller rests on the guide rail, wherein the roller has a projection formed by the recess at one, preferably both, side(s) which projection(s) engage(s) laterally over the guide rail, so that alignment of the roller is achieved by rotation about the second roller axis when the roller is transferred from the parallel portion to or back from the end portion of the rail.

In order to prevent ice from forming on the guiding element, which is designed in particular as a guide rail, it may be provided that the guiding element or each guiding element (in particular the guide rail) is provided with a heater or in each case one heater.

If the guiding device according to the invention is arranged on a lower side of the sliding door, it is appropriate to enable the sliding door to be guided on its upper side with as little friction as possible. For this purpose it is proposed that the sliding door has at least one upper roller on its upper region with an immovably mounted roller axis around which the upper roller rotates, the roller axis of the upper roller preferably being aligned parallel to the frame plane. The upper roller preferably rests against a contact element extending along the door frame, so that the upper roller rolls over the contact element.

In order for the upper roller to be able to follow the sliding door's end movement directed towards the door frame into the closed position, it may be provided, for example, that the contact element has an indentation in which the upper roller is arranged in the closed position.

In order to seal off the interior of the freezer cabinet equipped with the sliding door arrangement from the environment, a seal can be arranged between the door frame and the sliding door, the seal being attached either to the door frame or to the sliding door. The seal is in particular arranged circumferentially around the sliding door on the side facing the door frame, so that the sliding door is sealed at its circumference.

To further increase sealing with respect to the environment, at least one magnetic element may be attached to the door frame and/or to the sliding door, by means of which the sliding door is held in the closed position. In particular, the magnetic element is also attached in such a manner that the sealing effect provided by the seal is ensured or increased. For this purpose, the magnetic element may also be arranged inside the seal.

In one embodiment, the sliding door arrangement and in particular the guiding device is designed in such a manner that the sliding door automatically moves from any open position into the closed position. For this purpose, a force application device could be provided, for example, which biases the sliding door into the closed position.

However, it is preferred that the roller arrangement, which is in particular connected to the sliding door arrangement, rests on a support surface having an incline so that due to gravity, the sliding door moves in the direction of the closed position without any further force being applied. The invention represents a major advantage, in particular in the case of such an automatically closing sliding door, since the forces required to reach the closed position are very low due to the second roller axis.

The door frame is in particular made of a plastic material, wherein within a frame element made of plastic, a heater can be arranged with which the sliding door can be prevented from freezing to the door frame in its closed position.

The invention is particularly aimed at freezer cabinets which have a cooling unit for generating temperatures of below −15° C. to, for example, −40° C. In particular, temperatures of about −20° C. are to be generated in the freezer cabinet without ambient air flowing into the freezer cabinet when the sliding doors are in the closed position.

Figure 2:
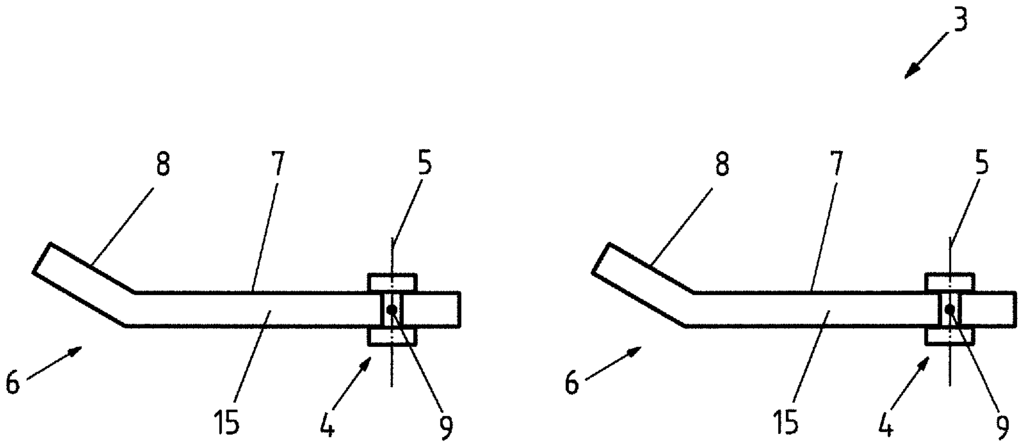
Figure 3:
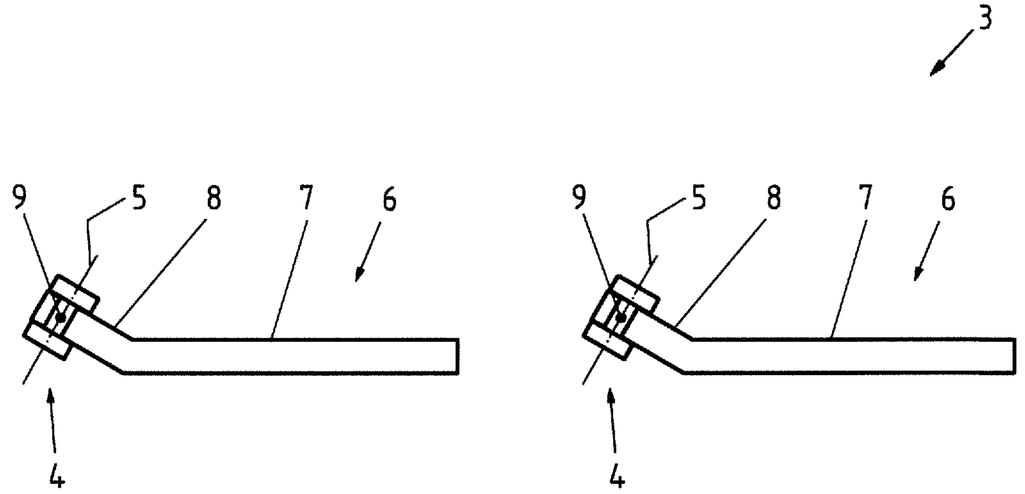
Figure 4:
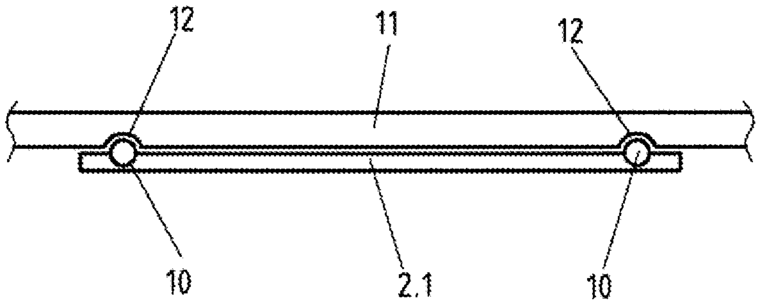
Figure 5:
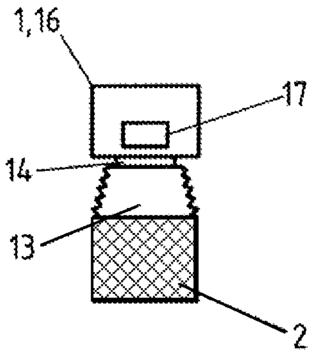

The invention as well as the technical background are exemplified in the following based on the figures. In the figures, schematically:

FIG. 1: shows a sliding door arrangement,

FIG. 2: shows a top view of a guiding device of a sliding door of the sliding door arrangement in an open position of the sliding door, FIG. 3: shows the view according to FIG. 2 in a closed position of the sliding door, FIG. 4: shows a top view of the sliding door arrangement in the upper region of the sliding door arrangement, and FIG. 5: shows a cross-sectional view through an element of the door frame and a part of the sliding door arrangement in the closed position.

The sliding door arrangement shown in FIG. 1 comprises a door frame 1 at a front side of which a first sliding door 2.1 is arranged and at a rear side of which a second sliding door 2.2 is arranged. The door frame 1 defines a frame plane along which the sliding doors 2.1 and 2.2 can be moved in each case between an open position and a closed position.

The door frame 1 consists of frame elements 16, which are made of plastic.

Furthermore, the sliding door arrangement has a guiding device 3, wherein each sliding door 2.1 and 2.2 has two roller arrangements 4 of the guiding devices 3 on its respective lower side. The roller arrangements 4 rest on guiding elements 6 of the guiding device 3. The guiding device 3 is explained in more detail below with reference to FIGS. 3 and 4.

Moreover, the sliding doors 2.1 and 2.2 each have two upper rollers 10 at their upper ends, the roller axes of which are aligned vertically. As is apparent from FIG. 4, the upper rollers 10 rest against a contact element 11 of the door frame 1, wherein the upper rollers 10 are located in an indentation 12 when the associated sliding door is in the closed position.

The guiding device 3 is shown in detail in FIGS. 2 and 3. Here, the guiding elements 6 are designed as rails with a parallel portion 7 running parallel to the frame plane. In addition, the rails have an end portion 8 that is angled with respect to the parallel portion 7. The rail has a support surface 15 on its upper side.

The roller arrangement 4 attached to the sliding door 2 has a roller with a recess so that the recess area rests on the support surface 15 of the rail and the roller engages laterally over the rail. During movement along the rail, the roller rotates about a first roller axis 5. Moreover, the roller is mounted to be rotatable about a second roller axis 9. If the first sliding door 2.1 is now moved from the open position shown in FIG. 2 to the closed position shown in FIG. 3, the roller always rotates about the first roller axis 5, wherein due to the rotatable mounting about the second roller axis 9, the roller automatically aligns itself at the transition from the parallel portion 7 to the end portion 8, so that no increased resistance is caused by the roller arrangement 4 during the end movement on the end portion 8.

The support surface 15 is arranged with such an inclination that due to gravity, the sliding door 2 reaches the closed position according to FIG. 3 without any further external forces.

Due to the angled alignment of the end portion 8, the sliding door 2 is thus moved towards the door frame 1 shortly before reaching the closed position, wherein due to the design of the second roller axis 9, this end movement is not hindered by the rollers, while a movement parallel (on the parallel portion 8) to the frame plane into the open position is possible without applying much force.

As is apparent from FIG. 5, a seal 13 is arranged between the sliding door 2 and a frame element 16 of the door frame 1. It can also be seen that a heater 17 is formed in the frame element 16, which heater 17 can be used to prevent the sliding door 2 from freezing to the door frame 1. In order to further enhance the sealing, a magnetic element 14 is attached to the door frame 1, which pulls the sliding door 2 into the closed position, thus increasing the sealing effect of the seal 3.

REFERENCE LIST

1 door frame
2.1, 2.2 sliding door
3 guiding device
4 roller arrangement
5 first roller axis
6 guiding element
7 parallel portion
8 end portion
9 second roller axis
10 upper roller
11 contact element
12 indentation
13 seal
14 magnetic element
15 support surface
16 frame element
17 heater

The invention claimed is:

1. A sliding door arrangement for a freezer cabinet, comprising a door frame (1), wherein the door frame (1) defines a frame plane, a sliding door (2), wherein the sliding door (2) is movable along the frame plane between an open position and a closed position, wherein a magnetic element (14) is attached on the door frame (1) or the sliding door (2), wherein the magnetic element (14) is configured to hold the sliding door (2) in the closed position, and a guiding device (3) for guiding the sliding door (2) between the open position and the closed position, wherein the guiding device (3) facilitates automatic movement of the sliding door (2) from the open position to the closed position, wherein the guiding device (3) comprises roller arrangements (4) each with a first roller axis (5) and at least one guiding element (6) guiding the movement of the sliding door (2), wherein the roller arrangements (4) are arranged on a lower side of the sliding door (2), wherein the sliding door (2) has in its upper region upper rollers (10) with roller axes that are vertically aligned parallel to the frame plane and orthogonal to the first roller axis (5), characterized in that the roller arrangements (4) rest on a support surface (15) of the guiding element (6), where the support surface (15) has an incline, the upper rollers (10) rest against a contact element (11) during the movement between the open position and the closed position, wherein the contact element has horizontal indentations (12) in which the upper rollers (10) are arranged when the sliding door is in the closed position, the guiding device (3) allows the sliding door (2) to move transversely to the frame plane during the movement from the open position to the closed position, wherein the guiding element (6) has a parallel portion (7) arranged parallel to the frame plane and an end portion (8) arranged transversely to the parallel portion (7), and the roller arrangements (4) each have a second roller axis (9), so that during a movement along the guiding element (6), the roller arrangements (4) can move both parallel to the parallel portion (7) and transverse thereto.

2. The sliding door arrangement according to claim 1, wherein the first roller axis (5) is rotatable about the second roller axis (9) so that the roller arrangements (4) automatically align themselves with the parallel portion (7) and with the end portion (8) when moving along the guiding element (6).

3. The sliding door arrangement according to claim 1, wherein the second roller axis (9) is aligned parallel to the frame plane.

4. The sliding door arrangement according to claim 1, wherein the guiding element (6) comprises a guide rail that includes the support surface (15).

5. The sliding door arrangement according to claim 1, wherein a seal (13) is arranged on the door frame (1) or the sliding door (2), which, in the closed position, seals off an interior of the freezer cabinet from an environment.

6. The sliding door arrangement according to claim 5, wherein the magnetic element (14) is arranged such that the effect of the seal (13) is ensured or increased.

7. The sliding door arrangement according to claim 1, wherein the door frame (1) comprises frame elements (16) made of plastic.

8. The sliding door arrangement according to claim 1, wherein the door frame (1) comprises a heater (17).

9. A freezer cabinet having a sliding door arrangement, wherein the freezer cabinet maintains temperatures below minus 15° C., and further wherein the sliding door arrangement comprises:

a door frame (1), wherein the door frame (1) defines a frame plane, a sliding door (2), wherein the sliding door (2) is movable along the frame plane between an open position and a closed position, wherein a magnetic element (14) is attached on the door frame (1) or the sliding door (2), wherein the magnetic element (14) is configured to hold the sliding door (2) in the closed position, and a guiding device (3) for guiding the sliding door (2) between the open position and the closed position, wherein the guiding device (3) facilitates automatic movement of the sliding door (2) from the open position to the closed position, wherein the guiding device (3) comprises roller arrangements (4) each with a first roller axis (5) and at least one guiding element (6) guiding the movement of the sliding door (2), wherein the roller arrangements (4) are arranged on a lower side of the sliding door (2), wherein the sliding door (2) has in its upper region upper rollers (10) with roller axes that are vertically aligned parallel to the frame plane and orthogonal to the first roller axis (5), characterized in that the roller arrangements (4) rest on a support surface (15) of the guiding element (6), where the support surface (15) has an incline, the upper rollers (10) rest against a contact element (11) during the movement between the open position and the closed position, wherein the contact element has horizontal indentations (12) in which the upper rollers (10) are arranged when the sliding door is in the closed position, the guiding device (3) allows the sliding door (2) to move transversely to the frame plane during the movement from the open position to the closed position, wherein the guiding element (6) has a parallel portion (7) arranged parallel to the frame plane and an end portion (8) arranged transversely to the parallel portion (7), and the roller arrangements (4) each have a second roller axis (9), so that during a movement along the guiding element (6), the roller arrangements (4) can move both parallel to the parallel portion (7) and transverse thereto.

10. The sliding door arrangement according to claim 1, wherein the roller arrangements (4) are omni wheels.

11. The sliding door arrangement according to claim 1, wherein the guiding device (3) is arranged on the lower side of the sliding door (2).

12. The sliding door arrangement according to claim 11, wherein the roller arrangements (4) comprise a roller arrangement that includes a recess.

13. The sliding door arrangement according to claim 1, where the roller axes of the upper rollers are in parallel with the second roller axis (9) of the roller arrangements (4).

* * * * *